(12) United States Patent
Nemoto et al.

(10) Patent No.: US 12,168,453 B2
(45) Date of Patent: Dec. 17, 2024

(54) VEHICLE CONTROL SYSTEM

(71) Applicant: TOYOTA JIDOSHA KABUSHIKI KAISHA, Toyota (JP)

(72) Inventors: Kazuki Nemoto, Susono (JP); Shin Tanaka, Numazu (JP); Satoshi Nakamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 17/526,305

(22) Filed: Nov. 15, 2021

(65) Prior Publication Data

US 2022/0194422 A1    Jun. 23, 2022

(30) Foreign Application Priority Data

Dec. 22, 2020 (JP) ................................ 2020-212794

(51) Int. Cl.
    *B60W 60/00*    (2020.01)
(52) U.S. Cl.
    CPC ............................. *B60W 60/0011* (2020.02)
(58) Field of Classification Search
    CPC .................................................. B60W 60/0011
    See application file for complete search history.

(56) References Cited

U.S. PATENT DOCUMENTS

| | | | | |
|---|---|---|---|---|
| 11,704,998 | B2* | 7/2023 | Huang | .................. H04W 4/021 |
| | | | | 701/117 |
| 2019/0382013 | A1 | 12/2019 | Li et al. | |
| 2020/0353918 | A1 | 11/2020 | Goto et al. | |

FOREIGN PATENT DOCUMENTS

| | | | | |
|---|---|---|---|---|
| CN | 110588642 A | | 12/2019 | |
| CN | 111132882 A | | 5/2020 | |
| JP | 2009137385 A | * | 6/2009 | ............... B60T 7/12 |
| JP | 2010202030 A | * | 9/2010 | |
| JP | 2017-114195 A | | 6/2017 | |
| JP | 2019043193 A | * | 3/2019 | ............... B60T 7/12 |
| JP | 2019-214318 A | | 12/2019 | |

* cited by examiner

*Primary Examiner* — Aryan E Weisenfeld
(74) *Attorney, Agent, or Firm* — Dinsmore & Shohl LLP

(57) ABSTRACT

A vehicle control system includes an automatic driving control device that generates a target trajectory used for automatic driving, and a vehicle travel control device that executes vehicle travel control such that a vehicle follows the target trajectory. The vehicle travel control device determines whether an operating condition of travel support control for reducing a risk when the vehicle travels is satisfied based on driving environment information, acquired from a plurality of sensor devices, and executes the travel support control in a case where the operating condition is satisfied. The vehicle travel control device generates risk information based on the driving environment information, and transmits the risk information to the automatic driving control device before the operating condition is satisfied. The automatic driving control device generates or corrects the target trajectory based on the received risk information.

8 Claims, 7 Drawing Sheets

VEHICLE CONTROL SYSTEM

CROSS-REFERENCE TO RELATED APPLICATION

This application claims priority to Japanese Patent Application No. 2020-212794 filed on Dec. 22, 2020, incorporated herein by reference in its entirety.

BACKGROUND

1. Technical Field

The present disclosure relates to a vehicle control system.

2. Description of Related Art

Japanese Unexamined Patent Application Publication No. 2017-114195 discloses a vehicle control device which is capable of avoiding intervention in travel control when collision avoidance control is executed. The vehicle control device executes a first control (collision avoidance control) for avoiding collision between the vehicle and obstacles. Further, the vehicle control device executes a second control such as cruise control and lane keeping control. The vehicle control device recognizes obstacles around the vehicle, and determines whether a predetermined collision avoidance condition is satisfied based on the recognition result. In a case where the collision avoidance condition is satisfied during the execution of the second control, the vehicle control device stops the second control and executes the first control.

SUMMARY

There is a case where a travel support control that determines a driving environment around the vehicle and intervenes in a control amount of the vehicle travel control is executed during automatic driving of the vehicle. During the automatic driving, a target trajectory is generated by an automatic driving control device that manages the automatic driving. The vehicle travel control is executed by a vehicle travel control device such that the vehicle follows the target trajectory for automatic driving.

However, the target trajectory for automatic driving which is generated by the automatic driving control device may not always be appropriate from a viewpoint of vehicle safety. For example, a target trajectory may be generated that requires a sudden lane change or overtaking of a leading vehicle. In a case where the vehicle travel control is executed to follow such an inappropriate target trajectory, the travel support control that intervenes in the control amount of the vehicle travel control may be executed too frequently. If the travel support control intervenes too frequently, occupants of the vehicle and people in the vicinity of the vehicle may feel uncomfortable or anxious.

The present disclosure provides a vehicle control system which is capable of reducing intervention frequency of the travel support control by a vehicle travel control device, and is capable of suppressing discomfort and anxiety of occupants.

An aspect of the present disclosure relates to a vehicle control system which controls a vehicle that executes automatic driving. The vehicle control system includes an automatic driving control device configured to generate a target trajectory used for the automatic driving of the vehicle, and a vehicle travel control device configured to execute vehicle travel control for controlling a travel control amount of the vehicle such that the vehicle follows the target trajectory. The vehicle travel control device includes a plurality of sensor devices, each of which acquires driving environment information that is information indicating a driving environment of the vehicle. The vehicle travel control device is configured to determine whether an operating condition of travel support control is satisfied based on the driving environment information, and execute the travel support control in a case where the operating condition is satisfied. The travel support control intervenes in the travel control amount to reduce a risk when the vehicle travels. The vehicle travel control device is configured to generate risk information, which is information on the risk, based on the driving environment information, and transmit the risk information to the automatic driving control device before the operating condition is satisfied. The automatic driving control device is configured to generate or correct the target trajectory based on the received risk information.

In the aspect, the risk information may include risk object information on a risk object which causes the risk. The automatic driving control device may generate or correct the target trajectory based on the risk object information.

In the aspect, the risk information may include risk environment information on a risk environment which causes the risk. The automatic driving control device may generate or correct the target trajectory based on the risk environment information.

In the aspect, the risk information may include a recommended trajectory which is generated based on the driving environment information. The automatic driving control device may generate or correct the target trajectory based on the recommended trajectory.

In the aspect, the automatic driving control device may generate or correct the target trajectory based on reliability of the risk information.

In the aspect, the automatic driving control device may determine whether the received risk information is associated with a specified scene in which the target trajectory is prioritized, and notify, upon determining that the risk information is associated with the specified scene, the vehicle travel control device of the determination result. The vehicle travel control device may restrict, upon receiving a notification regarding the determination result, execution of the travel support control corresponding to the specified scene.

According to the present disclosure, the vehicle travel control device generates the risk information based on the driving environment information acquired based on the plurality of sensor devices and transmits the risk information to the automatic driving control device. The automatic driving control device generates or corrects the target trajectory based on the received risk information. Accordingly, the risk determined by the plurality of sensor devices provided in the vehicle travel control device can be reflected in the target trajectory, thus the intervention frequency of the travel support control executed by the vehicle travel control device is reduced so as to suppress discomfort and anxiety that the occupants may feel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described with reference to drawings. However, in a case where the specific number related to elements, e.g., the number, quantity, and range, is referred to in the embodiments shown below, the present disclosure is not limited to such a number unless the number is specifically clarified or clearly specified in principle.

EMBODIMENTS

1. Overall Configuration of Vehicle Control System of Present Embodiment

Figure 1:
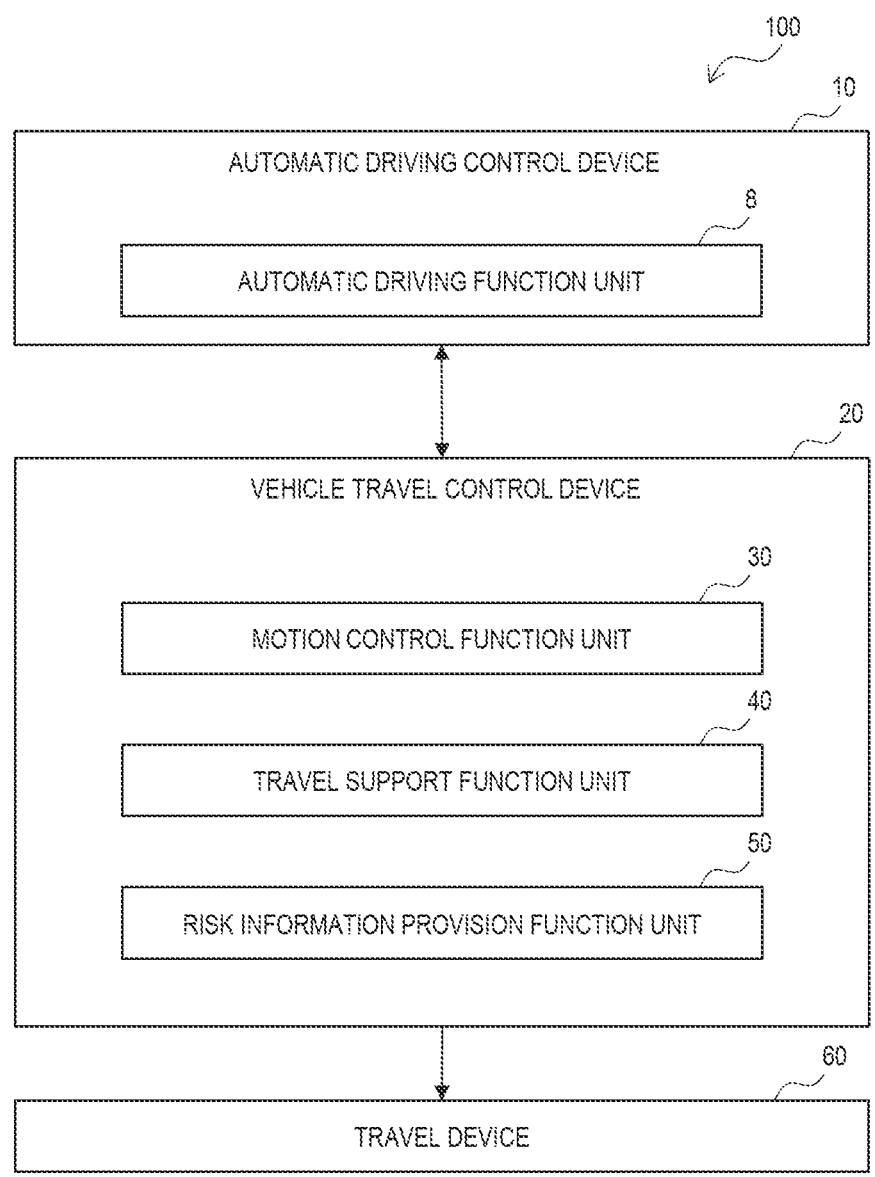
FIG. 1 is a block diagram of a configuration example illustrating an outline of the vehicle control system of the present embodiment.

First, a schematic configuration of the vehicle control system of the present embodiment will be described. FIG. 1 is a block diagram of a configuration example illustrating an outline of the vehicle control system of the present embodiment. A vehicle control system 100 shown in FIG. 1 is mounted on a vehicle. Hereinafter, the vehicle on which the vehicle control system 100 is mounted is also referred to as "vehicle V1". The vehicle V1 is a self-driving vehicle capable of automatic driving. The "automatic driving" herein is referred to automatic driving beyond level 2 as defined by the Society of Automotive Engineers (SAE). A power source of the vehicle V1 is not limited.

The vehicle control system 100 controls the vehicle V1. Alternatively, at least a part of the vehicle control system 100 may be located in an external device outside the vehicle so as to remotely control the vehicle. That is, the vehicle control system 100 may be distributed in the vehicle V1 and the external device.

As shown in FIG. 1, the vehicle control system 100 includes an automatic driving control device 10, a vehicle travel control device 20, and a travel device 60. The automatic driving control device 10 is a system for managing the automatic driving of the vehicle V1. The vehicle travel control device 20 is a system that executes the vehicle travel control of the vehicle V1. The automatic driving control device 10 and the vehicle travel control device 20 may be physically separated or integrated. In a case where the automatic driving control device 10 and the vehicle travel control device 20 are physically separated, they transmit and receive necessary information via communication.

The travel device 60 includes a steering device, a driving device, and a braking device. The steering device steers wheels of the vehicle V1. The driving device is a drive source that generates a driving force for the vehicle V1. Examples of the driving device include an engine and an electric motor. The braking device generates a braking force in the vehicle V1. The travel device 60 controls traveling of the vehicle V1 based on a travel control amount associated with steering, acceleration, and deceleration of the vehicle V1.

The automatic driving control device 10 has an automatic driving function unit 8 as a function for automatically driving the vehicle V1. Further, the vehicle travel control device 20 includes a motion control function unit 30, a travel support function unit 40, and a risk information provision function unit 50 as functions for executing vehicle travel control, preventive safety control, and risk information provision control, respectively. Hereinafter, configurations and functions of the automatic driving control device 10 and the vehicle travel control device 20 will be described with reference to FIGS. 2 to 5.

2. Configuration and Function of Automatic Driving Control Device

Figure 2:
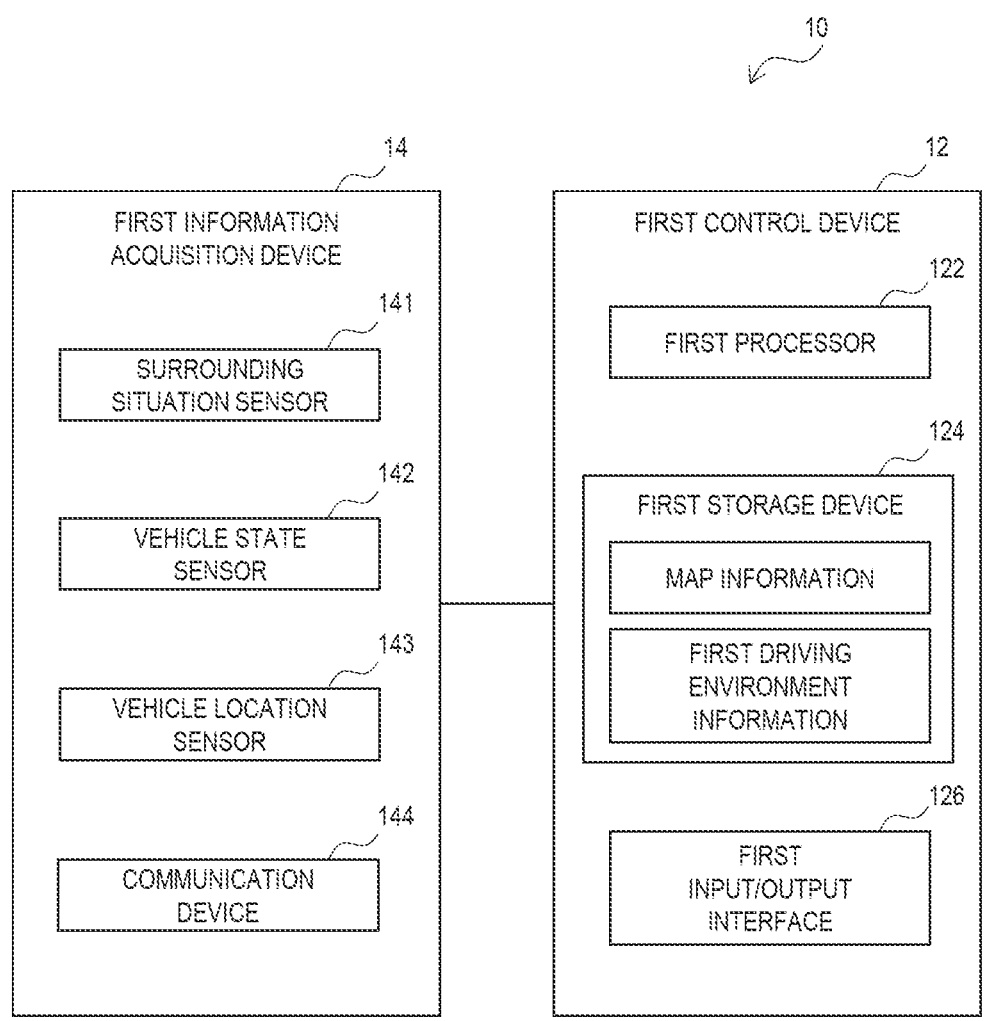
FIG. 2 is a block diagram illustrating a configuration example of the automatic driving control device according to the present embodiment.

FIG. 2 is a block diagram illustrating a configuration example of the automatic driving control device according to the present embodiment. As shown in FIG. 2, the automatic driving control device 10 includes a first control device 12 that manages the automatic driving of the vehicle V1. Further, the automatic driving control device 10 includes a first information acquisition device 14 connected to an input side of the first control device 12.

The first information acquisition device 14 is configured to include a surrounding situation sensor 141, a vehicle state sensor 142, a vehicle location sensor 143, and a communication device 144.

The surrounding situation sensor 141 recognizes peripheral information of the vehicle V1. For example, the surrounding situation sensor 141 includes a camera (image capturing device), a Laser Imaging Detection and Ranging (LIDAR), a radar, and the like. The peripheral information includes object information recognized by the surrounding situation sensor 141. Examples of the object include surrounding vehicles, pedestrians, roadside objects, obstacles, white lines, traffic lights, and the like. The object information includes relative position and relative speed of the object with respect to the vehicle V1. The peripheral information recognized by the surrounding situation sensor 141 is transmitted to the first control device 12 from time to time.

The vehicle state sensor 142 detects vehicle information indicating a state of the vehicle V1. Examples of the vehicle state sensor 142 include a vehicle speed sensor, a lateral acceleration sensor, and a yaw rate sensor. The vehicle information detected by the vehicle state sensor 142 is transmitted to the first control device 12 from time to time.

The vehicle location sensor 143 detects location and orientation of the vehicle V1. For example, the vehicle location sensor 143 may include a Global Positioning System (GPS) sensor. The GPS sensor receives signals transmitted from a plurality of GPS satellites and calculates the location and orientation of the vehicle V1 based on the received signals. The vehicle location sensor 143 may perform a well-known self-location estimation process (localization) to improve accuracy of information indicating the current location of the vehicle V1. The vehicle information detected by the vehicle location sensor 143 is transmitted to the first control device 12 from time to time.

The communication device 144 communicates with the vehicle and the outside. For example, the communication device 144 communicates with the external device of the vehicle V1 via a communication network. Examples of the external device herein include roadside devices, surrounding vehicles, peripheral infrastructure, and the like. The roadside device is a beacon device that transmits, for example, traffic congestion information, traffic information for each lane, regulation information indicating the location where the vehicle stops, and information on a traffic situation at a blind spot. In a case where the external device is the surrounding vehicle, the communication device 144 performs vehicle-to-vehicle communication (V2V communication) with the surrounding vehicle. In a case where the external device is the peripheral infrastructure, the communication device 144 performs vehicle-to-infrastructure communication (V2I communication) with the peripheral infrastructure.

The first control device 12 is an information processing device that executes various processes in the vehicle control system 100. Typically, the first control device 12 is a microcomputer including a first processor 122, a first storage device 124, and a first input/output interface 126. The first control device 12 is also referred to as an electronic control unit (ECU).

Various information is stored in the first storage device 124. For example, the first storage device 124 stores the first driving environment information acquired by the first information acquisition device 14. The first driving environment information is information indicating the driving environment of the vehicle V1, which includes, for example, the vehicle location information indicating the location of the vehicle V1, the vehicle state information indicating the state of the vehicle V1, and the surrounding situation information indicating the situation around the vehicle V1. Examples of the first storage device 124 include a volatile memory, a non-volatile memory, a hard disk drive (HDD), and the like.

The first storage device 124 stores map information including detailed road information. This map information includes, for example, road shape, number of lanes, lane width, and the like. Alternatively, the map information may be stored in an external management server. In such a case, the first control device 12 communicates with the management server and acquires necessary map information. The acquired map information is recorded in the first storage device 124.

The first processor 122 executes automatic driving software which is a computer program. The automatic driving software is stored in the first storage device 124. Alternatively, the automatic driving software is recorded on a computer-readable recording medium. The functions of the first control device 12 are implemented by the first processor 122 executing the automatic driving software.

In particular, the functions of the automatic driving function unit 8 are implemented by the first processor 122 executing the automatic driving software associated with the automatic driving of the vehicle V1. The automatic driving function unit 8 is incorporated in the first control device 12 as a function for automatically driving the vehicle V1. Typically, the first control device 12 executes a target trajectory generation process for generating a target trajectory for automatic driving of the vehicle V1. In addition, the first control device 12 receives the risk information described later and executes a target trajectory correction process for correcting the target trajectory.

The target trajectory includes at least a set of target locations [Xi, Yi] of the vehicle V1 on a road on which the vehicle V1 travels. The X direction is a longitudinal direction of the vehicle V1, and the Y direction is a lateral direction orthogonal to the X direction. The target trajectory may further include a target speed [VXi, VYi] for each target location [Xi, Yi].

Figure 3:
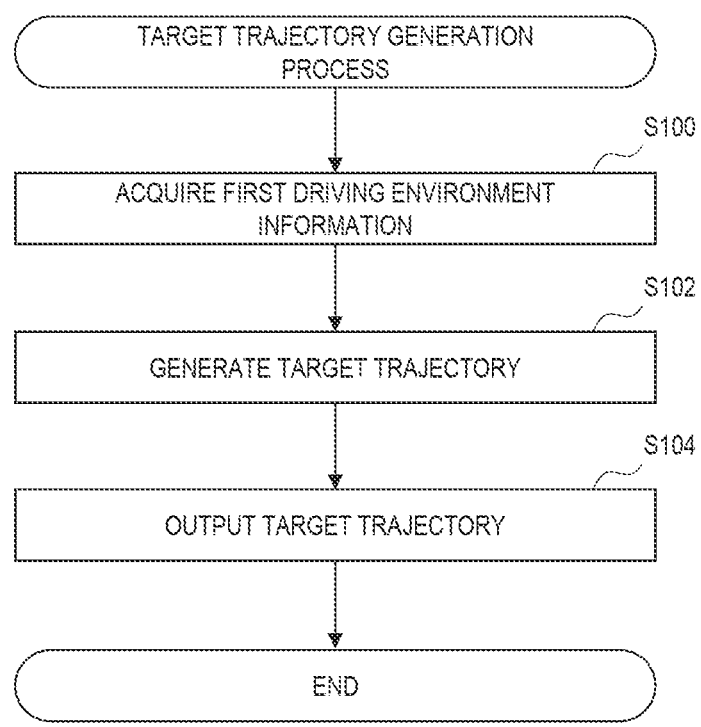
FIG. 3 is a flowchart illustrating a control routine of a target trajectory generation process, executed by a first control device of the automatic driving control device according to the present embodiment.

FIG. 3 is a flowchart illustrating a control routine of the target trajectory generation process, executed by the first control device of the automatic driving control device according to the present embodiment. The control routine shown in FIG. 3 is repeatedly executed at a predetermined control cycle during the automatic driving of the vehicle V1.

In the control routine shown in FIG. 3, the first control device 12 acquires the first driving environment information from the first information acquisition device 14 (step S100). The first driving environment information is stored in the first storage device 124.

The first control device 12 generates a target trajectory for automatic driving of the vehicle V1 based on the map information, the first driving environment information, and the risk information (step S102). More specifically, the first control device 12 generates a travel plan of the vehicle V1 during the automatic driving based on the map information and the first driving environment information. The first control device 12 generates a target trajectory necessary for the vehicle V1 to travel according to the generated travel plan based on the first driving environment information.

For example, the first control device 12 generates a target trajectory for overtaking a leading vehicle. More specifically, the first control device 12 recognizes the leading vehicle based on the surrounding situation information. Further, the first control device 12 predicts future locations of the vehicle V1 and the leading vehicle based on the vehicle state information and the surrounding situation information, and generates a target trajectory such that the vehicle V1 can avoid and overtake the leading vehicle.

The first input/output interface 126 is an interface through which the first control device 12 transmits and receives the information to and from the vehicle travel control device 20. The first control device 12 outputs the generated target trajectory to the vehicle travel control device 20 via the first input/output interface 126 (step S104). Every time the target trajectory is updated, the latest target trajectory is output to the vehicle travel control device 20.

3. Configuration and Function of Vehicle Travel Control Device

Figure 4:
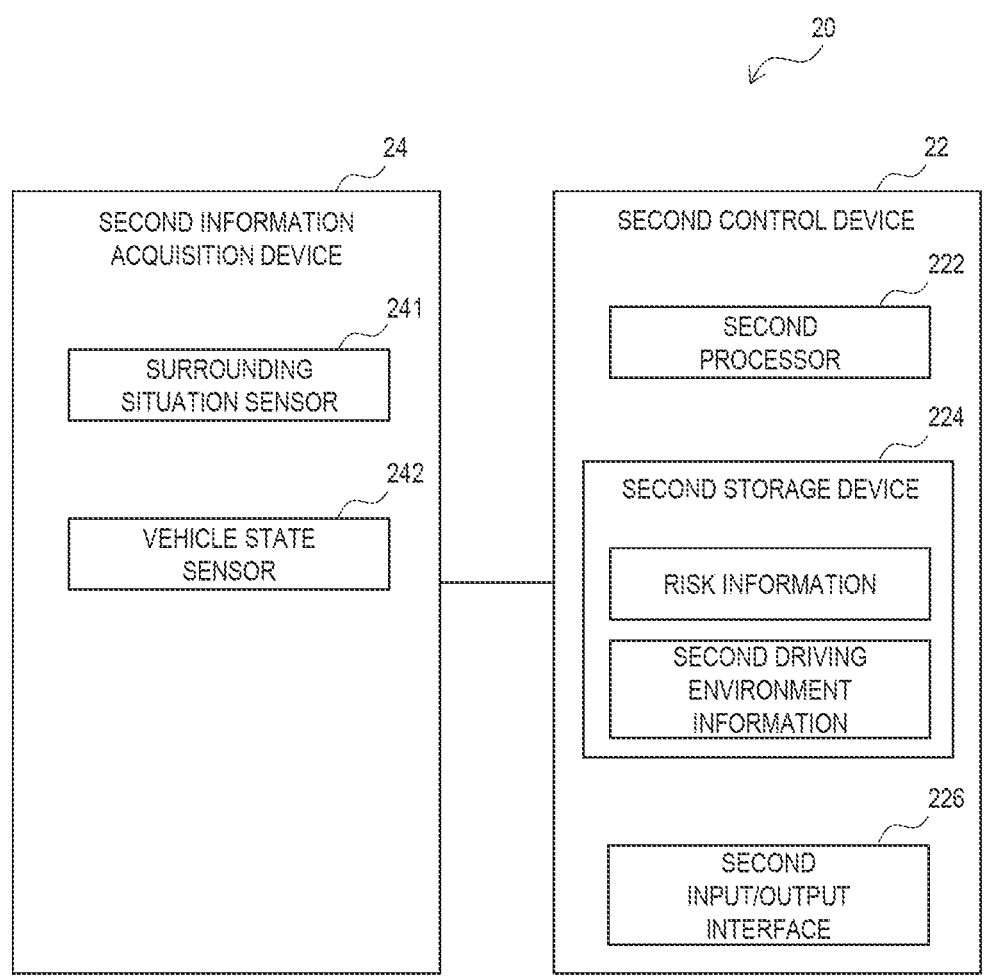
FIG. 4 is a block diagram illustrating a configuration example of the vehicle travel control device according to the present embodiment.

FIG. 4 is a block diagram illustrating a configuration example of the vehicle travel control device according to the present embodiment. As shown in FIG. 4, the vehicle travel control device 20 includes a second control device 22, a second information acquisition device 24, and a second input/output interface 226.

The second information acquisition device 24 is configured to include a surrounding situation sensor 241 and a vehicle state sensor 242, as the plurality of sensor devices.

The surrounding situation sensor 241 recognizes peripheral information of the vehicle V1. For example, the surrounding situation sensor 241 includes a camera (image capturing device), a Laser Imaging Detection and Ranging (LIDAR), a radar, and the like. The peripheral information includes object information recognized by the surrounding situation sensor 241. Examples of the object include surrounding vehicles, pedestrians, roadside objects, obstacles, white lines, traffic lights, and the like. The object information includes relative location, relative speed, relative acceleration, and time-to-collision (TTC) with respect to the vehicle V1, as well as collision probability, probability of the existence of the object, future trajectory, and the like. The peripheral information recognized by the surrounding situation sensor 241 is transmitted to the second control device 22 from time to time.

The vehicle state sensor 242 detects vehicle information indicating a state of the vehicle V1. Examples of the vehicle state sensor 242 include a vehicle speed sensor, a lateral acceleration sensor, and a yaw rate sensor. The vehicle information detected by the vehicle state sensor 242 is transmitted to the second control device 22 from time to time.

The first information acquisition device 14 and the second information acquisition device 24 may be partially integrated. For example, the surrounding situation sensor 141 and the surrounding situation sensor 241 may be the same. The vehicle state sensor 142 and the vehicle state sensor 242 may be the same. That is, the automatic driving control device 10 and the vehicle travel control device 20 may share a part of the first information acquisition device 14 or the second information acquisition device 24. In such a case, the automatic driving control device 10 and the vehicle travel control device 20 exchange necessary information with each other.

Further, the second information acquisition device 24 may further include the same devices as the vehicle location sensor 143 and the communication device 144, in addition to the surrounding situation sensor 241 and the vehicle state sensor 242.

The second control device 22 is an information processing device that executes various processes in the vehicle control system 100. Typically, the second control device 22 is a microcomputer including a second processor 222, a second storage device 224, and a second input/output interface 226. The second control device 22 is also referred to as an electronic control unit (ECU).

Various information is stored in the second storage device 224. For example, the second storage device 224 stores the second driving environment information acquired by the second information acquisition device 24. The second driving environment information is information indicating the driving environment of the vehicle V1, and includes, for example, the peripheral information and the vehicle information stated above. Additionally, the second storage device 224 stores the risk information described later. Examples of the second storage device 224 include a volatile memory, a non-volatile memory, a hard disk drive (HDD), and the like.

The second processor 222 executes vehicle travel control software which is a computer program. The vehicle travel control software is stored in the second storage device 224. Alternatively, the vehicle travel control software is recorded on a computer-readable recording medium. The functions of the second control device 22 are implemented by the second processor 222 executing the vehicle travel control software.

Specifically, functions of the motion control function unit 30, the travel support function unit 40, and the risk information provision function unit 50 are implemented by the second processor 222 executing the vehicle travel control software associated with the vehicle travel control. That is, the motion control function unit 30, the travel support function unit 40, and the risk information provision function unit 50 are incorporated in the second control device 22 as functions for executing vehicle travel control, travel support control, and risk information provision control, respectively.

The motion control function unit 30, the travel support function unit 40, and the risk information provision function unit 50 may be incorporated in physically different control devices. In such a case, the vehicle travel control device 20 is provided with different control devices, i.e., a control device for the motion control function unit 30 configured to execute the vehicle travel control, a control device for the travel support function unit 40 configured to execute the travel support control, and a control device for the risk information provision function unit 50 configured to execute the risk information provision control.

The second input/output interface 226 is an interface with which the second control device 22 transmits and receives the information to and from the automatic driving control device 10. The target trajectory output from the first control device 12 is input to the vehicle travel control device 20 via the second input/output interface 226.

4. Controls Executed in the Vehicle Travel Control Device

The vehicle travel control and the travel support control, executed by the second control device 22 of the vehicle travel control device 20, will be described in detail hereinbelow.

4-1. Vehicle Travel Control

The second control device 22 executes the vehicle travel control for steering, acceleration, and deceleration of the vehicle V1. Typically, the second control device 22 executes the vehicle travel control by controlling operations of the travel device 60. In particular, the second control device 22 controls the steering of the vehicle V1 by controlling the steering device. The second control device 22 controls the acceleration of the vehicle V1 by controlling the driving device. The second control device 22 controls the deceleration of the vehicle V1 by controlling the braking device.

In the vehicle travel control, the second control device 22 receives the target trajectory from the automatic driving control device 10 during the automatic driving of the vehicle V1. Basically, the second control device 22 controls the travel control amount associated with steering, acceleration, and deceleration of the vehicle V1 such that the vehicle V1 follows the target trajectory. Typically, the motion control function unit 30 calculates deviations (for example, lateral deviation, yaw angle deviation, and speed deviation) between various state quantities of the vehicle V1 and the target trajectory, and executes the vehicle travel control so as to reduce the deviations.

4-2. Travel Support Control

Figure 5:
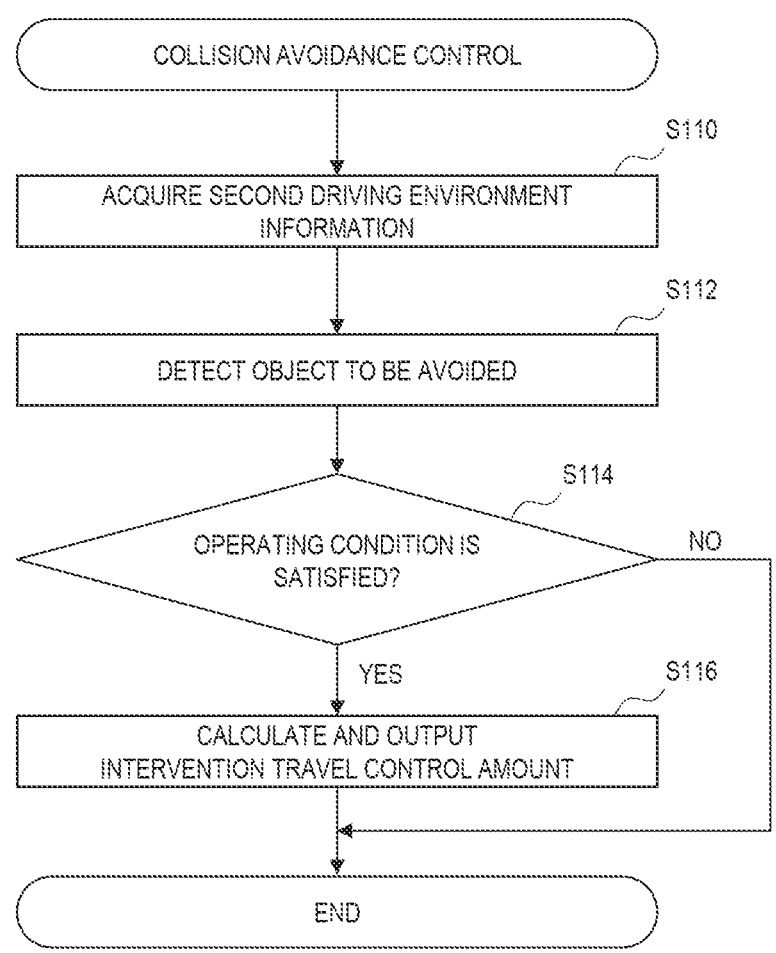
FIG. 5 is a flowchart illustrating a routine of a process associated with collision avoidance control executed by a second control device.

The second control device 22 executes the travel support control that intervenes in the travel control amount of the vehicle travel control for the purpose of improving the safety of the vehicle V1. Typically, the second control device 22 executes the collision avoidance control by which collision between the vehicle V1 and an object is avoided during the automatic driving of the vehicle V1. The collision avoidance control is also referred to as pre-crash safety (PCS). FIG. 5 is a flowchart illustrating a routine of a process associated with the collision avoidance control executed by the second control device 22. A routine shown in FIG. 5 is repeatedly executed by the second control device 22 at a predetermined control cycle during the automatic driving of the vehicle V1.

When the routine shown in FIG. 5 is started, the second control device 22 acquires the second driving environment information from the second information acquisition device 24 (step S110). The acquired second driving environment information is stored in the second storage device 224.

The second control device 22 detects an object to be avoided based on the second driving environment information (step S112). The second control device 22 determines whether an operating condition of the travel support control for avoiding collision with the object is satisfied (step S114). For example, the "time-to-collision (TTC) required for the vehicle V1 to collide with the object being smaller than a predetermined threshold" is set as the operating condition. Accordingly, in a case where the operating condition is not satisfied, the process of this routine is terminated. On the other hand, in a case where the operating condition is satisfied, the second control device 22 calculates an intervention travel control amount for avoiding collision with the object (step S116). The calculated intervention travel control amount is output to the motion control function unit 30.

Basically, the motion control function unit 30 calculates the travel control amount of the vehicle V1 such that the vehicle V1 follows the target trajectory. However, in a case where the intervention travel control amount is input from the travel support function unit 40, the motion control function unit 30 corrects the travel control amount based on the intervention travel control amount input from the travel support function unit 40. Typically, the motion control function unit 30 outputs the intervention travel control amount as the final travel control amount in a case where the intervention travel control amount is input from the travel support function unit 40.

5. Features of Vehicle Control System 100 of Present Embodiment

During the automatic driving of the vehicle V1, the automatic driving control device 10 determines the collision risk in the travel of the vehicle V1 based on the first driving environment information, and generates the target trajectory. The vehicle travel control device 20 controls the travel device 60 of the vehicle V1 such that the vehicle V1 follows the target trajectory.

The determination on the collision risk which is made by the automatic driving control device 10 does not necessarily match the determination on the collision risk made by the vehicle travel control device 20. For example, in a case where the automatic driving control device 10 generates a target trajectory for approaching and overtaking the leading vehicle, the vehicle travel control device 20 may determine that the vehicle has a high risk of collision with the leading vehicle and intervene with the travel support control. If the travel support control frequently intervenes, the occupants of the vehicle and the people in the vicinity of the vehicle V1 may feel uncomfortable or anxious. If the automatic driving control device 10 dismisses the intervention of the travel support control as a solution, however, it is impossible to mitigate the collision risk that the automatic driving control device 10 does not recognize or does not determine to be important.

Figure 6:
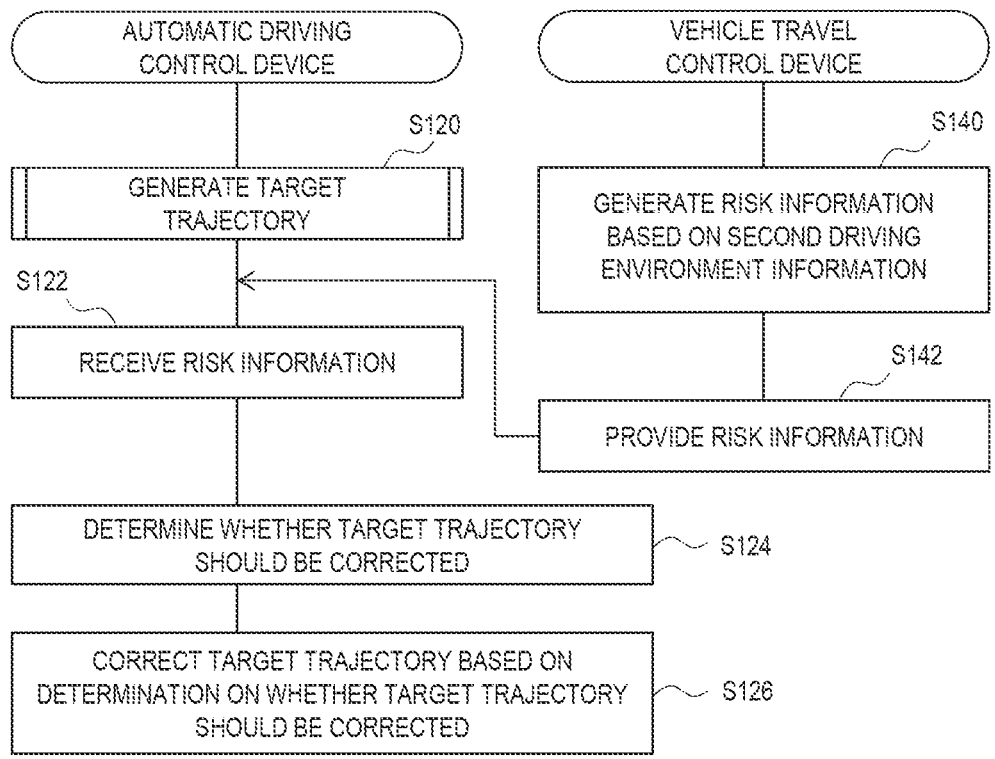
FIG. 6 is a flowchart illustrating flows of risk information provision control and a target trajectory correction process.

Therefore, in the vehicle control system 100 of the present embodiment, the problem stated above can be solved by executing the risk information provision control with the vehicle travel control device 20 and the target trajectory correction process with the automatic driving control device 10. FIG. 6 is a flowchart illustrating flows of the risk information provision control and the target trajectory correction process. Those controls will be described in detail with reference to the flowchart hereinbelow.

5-1. Risk Information Provision Control

The risk information provision control executed by the second control device 22 of the vehicle travel control device 20 will be described hereinbelow. In the risk information provision control, the vehicle travel control device 20 generates the information on the collision risk for the travel of the vehicle V1 based on the second driving environment information (step S140). This information is hereinafter referred to as the "risk information". Typically, examples of the risk information include risk object information, risk environment information, or recommended trajectory information.

The risk object information is information on a risk object with which the vehicle V1 has a risk of colliding while traveling. The risk object information includes relative location, relative speed, relative acceleration, and time-to-collision (TTC) of the risk object with respect to the vehicle V1, as well as collision probability, existence probability (reliability) of the risk object, and the like. As the existence probability (reliability) of the risk object, for example, an index calculated based on the time during which the risk object is continuously detected by the surrounding situation sensor 241 can be used.

The risk environment information is information on a risk environment in which the vehicle V1 has a risk of colliding while traveling. Examples of the risk environment information include white lines on roads, road edges, intersections with blind spots, blind spots between parked vehicles, blind spots of vehicles waiting to turn right or left, and the like. The recommended trajectory information is information on a trajectory recommended for reducing the collision risk.

The second control device 22 of the vehicle travel control device 20 generates the risk information based on the second driving environment information acquired from the second information acquisition device 24. The generated risk information is stored in the second storage device 224 from time to time. The second control device 22 transmits (provides) the risk information to the automatic driving control device 10 via the second input/output interface 226 before the operating condition of the travel support control associated with the risk information is satisfied (step S142).

5-2. Target Trajectory Correction Process

The target trajectory correction process executed by the first control device 12 of the automatic driving control device 10 will be described hereinbelow. The automatic driving control device 10 generates the target trajectory by the target trajectory generation process shown in FIG. 3 (step S120). In the target trajectory correction process, the automatic driving control device 10 receives the risk information provided by the vehicle travel control device 20 (step S122). The automatic driving control device 10 determines whether the target trajectory should be corrected based on the received risk information (step S124). The automatic driving control device 10 corrects (recalculates) the target trajectory according to the determination that the correction is required (step S126).

Basically, the automatic driving control device 10 corrects the target trajectory so as to eliminate the collision risk included in the risk information. However, the target trajectory may not be corrected when the vehicle V1 travels. Hereinafter, the target trajectory correction process executed by the first control device 12 of the automatic driving control device 10 will be described with reference to several exemplified cases.

For example, in a case where the risk information provided from the vehicle travel control device 20 is the risk object information, the risk object information includes information such as relative location, relative speed, relative acceleration, and time-to-collision (TTC) of the risk object with respect to the vehicle V1, as well as collision probability, existence probability (reliability) of the risk object, and the like. The first control device 12 determines whether the target trajectory should be corrected or not based on these pieces of the risk object information.

Figure 7:
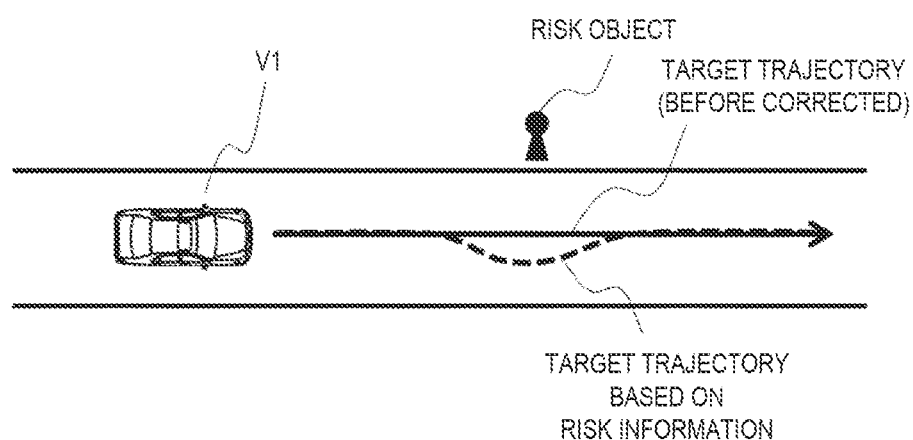
FIG. 7 is a diagram illustrating an example of a scene in which the target trajectory correction process is executed.

In the target trajectory correction process executed by the automatic driving control device 10, various measures can be considered depending on the cases encountered. As an example, there is a case in which the risk object in the risk object information is a pedestrian on the roadside of a wide street. FIG. 7 is a diagram illustrating an example of the case in which the target trajectory correction process is executed. In this case, in a case where the oncoming vehicle is not recognized, it can be determined that there is no risk of collision with the oncoming vehicle even if the vehicle travels at a wider distance from the pedestrian. In such a case, for example, the first control device 12 determines that the target trajectory should be corrected, and corrects the target trajectory using the risk object information so as to further increase the distance from the pedestrian in order to reduce the collision risk determined by the vehicle travel control device 20.

Figure 8:
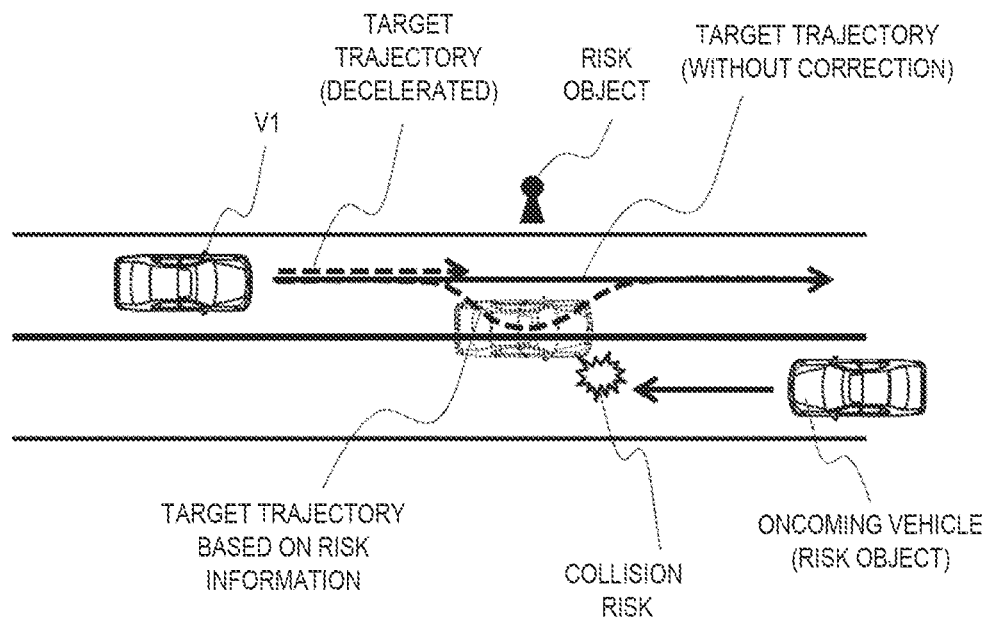
FIG. 8 is a diagram illustrating another example of a scene in which the target trajectory correction process is executed.

FIG. 8 is a diagram illustrating another example of a case in which the target trajectory correction process is executed. For the case shown in FIG. 8, the automatic driving control device 10 recognizes the oncoming vehicle as the risk object in the case where the risk object included in the risk object information is a pedestrian on the roadside of the street. In such a case, it can be determined that there is a risk of collision with the oncoming vehicle if the vehicle travels at a wider distance from the pedestrian. In such a case, for example, the first control device 12 determines that correction of the target trajectory is not required, or alternatively, corrects the target trajectory so as to further decelerate in order to reduce the collision risk determined by the vehicle travel control device 20.

As another example, there is a case in which the risk object included in the risk object information is a risk object already recognized by the automatic driving control device 10. In such a case, the first control device 12 compares survival probability (reliability) of the risk object included in the risk object information with survival probability (reliability) of the risk object obtained from the first driving environment information. In a case where the survival probability (reliability) of the risk object included in the risk object information is higher than the survival probability (reliability) of the risk object obtained from the first driving environment information, it is determined that the vehicle travel control device 20 detects the risk object with higher reliability than the automatic driving control device 10. In such a case, for example, the first control device 12 corrects the target trajectory by giving priority to the risk object included in the risk object information.

Alternatively, in a case where the survival probability (reliability) of the risk object included in the risk object information is lower than the survival probability (reliability) of the risk object obtained from the first driving environment information, it is determined that the current target trajectory can sufficiently reduce the risk of colliding with the risk object. In such a case, for example, the first control device 12 determines that the target trajectory is not required to be corrected.

As another example, there is a case in which the risk object included in the risk object information is a risk object not recognized by the automatic driving control device 10. In such a case, it may be possible to determine that the current target trajectory has not reduced the risk of collision with the risk object. In such a case, for example, the first control device 12 corrects the target trajectory so as to reduce the risk of collision with the risk object.

In a case where the risk information provided by the vehicle travel control device 20 is the recommended trajectory information, the first control device 12 determines that the target trajectory should be corrected such that the trajectory is adjusted to secure the maximum safety of the vehicle V1.

According to such a target trajectory correction process, it is possible to correct the target trajectory by using the risk information provided by the vehicle travel control device 20. Consequently, the target trajectory can be corrected before the operating condition of the travel support control is satisfied, thus it is possible to reduce the intervention frequency of the travel support control executed by the vehicle travel control device 20, thereby suppressing discomfort that the occupants may feel.

6. Modified Examples

The vehicle control system 100 of the present embodiment may adopt a modified aspect as follows.

6-1. Modified Example 1

The travel support control executed by the vehicle travel control device 20 is not limited to the collision avoidance control (PCS). That is, the vehicle travel control device 20 can execute another type of travel support control, such as lane departure alert (LDA) and proactive driving assist (PDA), for preventing deviation from the lane.

6-2. Modified Example 2

The automatic driving control device 10 corrects the generated target trajectory based on the risk information provided by the vehicle travel control device 20. However, the automatic driving control device 10 may generate the target trajectory in consideration of the risk information during the target trajectory generation process.

6-3. Modified Example 3

Figure 9:
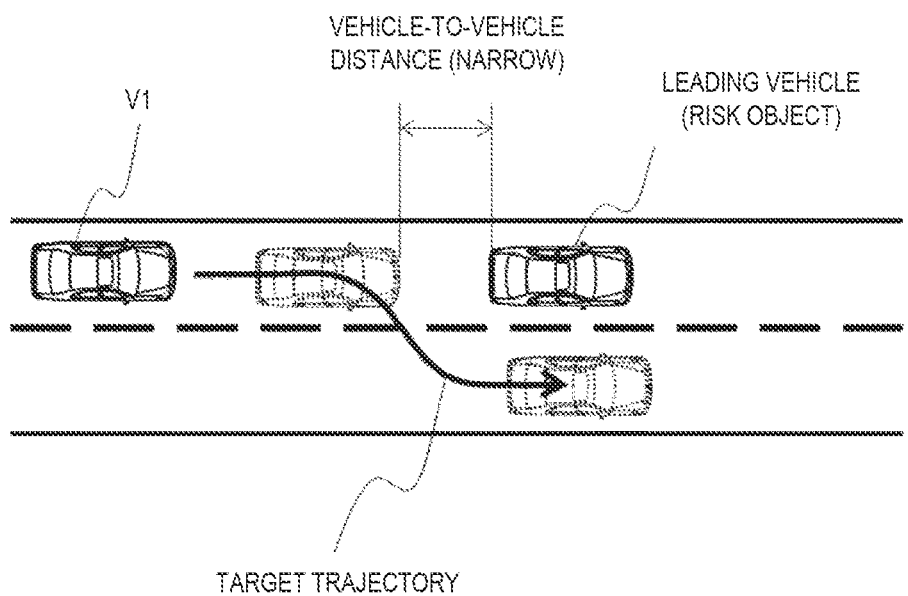
FIG. 9 is a diagram illustrating an example of a scene in which a vehicle V1 overtakes a leading vehicle.

Even in a case where the automatic driving control device 10 generates the target trajectory in consideration of the collision risk, the vehicle travel control device 20 may determine that the collision risk exists and then the automatic driving control device 10 may also transmit the risk information. FIG. 9 is a diagram illustrating an example of a case in which the vehicle V1 overtakes the leading vehicle. Examples thereof include a case in which the distance between the vehicle and the leading vehicle is temporarily narrowed when the automatic driving control device 10 overtakes the leading vehicle. In such a case, the target trajectory may not be changed even if the automatic driving control device 10 receives the risk information. However, when the target trajectory is not changed, the operating condition of the travel support control executed by the vehicle travel control device 20 is satisfied, and the travel support control intervenes unnecessarily.

Therefore, the vehicle travel control device 20 determines whether the received risk information is associated with a specified case in which the generated target trajectory should be prioritized. Examples of the specified case include a case in which the vehicle travel control device 20 temporarily narrows the distance between the leading vehicle and the following vehicle, in addition to the case in which the vehicle overtakes the leading vehicle.

In a case where it is determined that the provided risk information is associated with the specified case, the automatic driving control device 10 notifies the vehicle travel control device 20 of the determination result. The vehicle travel control device 20 receives the notice of the determination result, and then restricts the execution of the travel support control corresponding to the specified case. The vehicle travel control device 20 changes the threshold such that the operating condition of the travel support control is not easily satisfied. Alternatively, the vehicle travel control device 20 prohibits the travel support control.

Accordingly, in a case where the risk information provided by the vehicle travel control device 20 is associated with the specified case in which the target trajectory of the automatic driving control device 10 should be prioritized, the travel support control corresponding to the specified case can be restricted to be executed. Hence, it is possible to prevent the travel support control from being executed in the specified case where the travel support control is not required.

6-4. Modified Example 4

The automatic driving control device 10 and the vehicle travel control device 20 may be designed and developed separately. For example, the vehicle travel control device 20, which is responsible for vehicle travel control, is designed and developed by a developer (typically, automobile manufacturer) who is familiar with the mechanism and vehicle motion characteristics. In such a case, the vehicle travel control device 20 can have extremely high reliability. Assuming that such a highly reliable travel support function unit 40 is used, the automatic driving service provider can design and develop software for the automatic driving control device 10. In other words, the vehicle travel control device 20 can serve as a platform for automatic driving services.

What is claimed is:

1. A vehicle control system which controls a vehicle thatexecutes automatic driving, the vehicle control system comprising:
   an automatic driving control device includes a first processor configured to generate a target trajectory used for the automatic driving of the vehicle, and a first input/output interface; and
   a vehicle travel control device includes a second processor configured to execute vehicle travel control for controlling a travel control amount of the vehicle such that the vehicle follows the target trajectory, and a second input/output interface, wherein:
   the vehicle travel control device includes a second information acquisition device including a second plurality of sensor devices, each of which acquires a second driving environment information indicating a second driving environment of the vehicle;
   the first processor is configured to transmit the target trajectory to the second processor through the first input/output interface, and the second processor is configured to receive the target trajectory from the first processor through the second input/output interface;
   the second processor is configured to:
   determine whether an operating condition of travel support control is satisfied based on the second driving environment information, the travel support control intervening in the travel control amount to reduce a risk when the vehicle travels; and
   execute the travel support control in a case where the operating condition is satisfied;
   the second processor is configured to:
   generate risk information, which is information on the risk, based on the second driving environment information; and
   transmit the risk information to the first processor through the second input/output interface before the operating condition is satisfied; and
   the first processor is configured to generate or correct the target trajectory based on the received risk information through the first input/output interface,
   wherein the automatic driving control device includes a first information acquisition device including a first plurality of sensor devices, each of which acquires a first driving environment information indicating a first driving environment of the vehicle; and
   wherein the target trajectory is generated based on the first driving environment information, and the risk information is generated based on the second driving environment information; and
   wherein the target trajectory is corrected based on whichever has higher reliability between the risk object information and the first driving environment information.

2. The vehicle control system according to claim 1, wherein:
   the risk information includes risk object information on a risk object which causes the risk; and
   the first processor is configured to generate or correct the target trajectory based on the risk object information.

3. The vehicle control system according to claim 1, wherein:
   the risk information includes risk environment information on a risk environment which causes the risk; and
   the first processor is configured to generate or correct the target trajectory based on the risk environment information.

4. The vehicle control system according to claim 1, wherein:
   the risk information includes a recommended trajectory which is generated based on the second driving environment information; and
   the first processor is configured to generate or correct the target trajectory based on the recommended trajectory.

5. The vehicle control system according to claim 2, wherein the first processor is configured to generate or correct the target trajectory based on reliability of the risk information.

6. The vehicle control system according to claim 2, wherein:
   the first processor is configured to:
   determine whether the received risk information is associated with a specified scene in which the target trajectory is prioritized; and notify, upon determining that the risk information is associated with the specified scene, the second processor of a determination result; and the second processor is configured to, upon receiving a notification regarding the determination result, restrict execution of the travel support control corresponding to the specified scene.

7. The vehicle control system according to claim 1, wherein the target trajectory is corrected to reduce a collision risk determined by the second processor.

8. The vehicle control system according to claim 1, wherein the target trajectory is corrected to reduce a collision risk determined by the second processor.

* * * * *